United States Patent [19]

Espedalen

[11] Patent Number: 4,743,742
[45] Date of Patent: May 10, 1988

[54] COUNTING DEVICE FOR FISH, ESPECIALLY SMOLT

[76] Inventor: Kare Espedalen, Grensegaten 5, N-3290 Stavern, Norway

[21] Appl. No.: 899,423

[22] Filed: Aug. 22, 1986

[30] Foreign Application Priority Data

Sep. 3, 1985 [NO] Norway .................................. 853459

[51] Int. Cl.$^4$ ............................................ G06M 11/00
[52] U.S. Cl. .................. 235/1 R; 235/98 C; 377/6; 119/3
[58] Field of Search ................ 73/432.1, 866.5; 119/3; 235/1 R; 377/6; 235/98 C

[56] References Cited

U.S. PATENT DOCUMENTS

| | | | |
|---|---|---|---|
| 3,040,980 | 6/1962 | Mann et al. | 119/3 X |
| 3,223,319 | 12/1965 | Lucich et al. | 377/6 X |
| 3,938,340 | 2/1976 | Downs | 405/83 |
| 4,009,782 | 3/1977 | Grimshaw | 209/906 X |
| 4,046,996 | 9/1977 | Williams et al. | 119/3 X |

FOREIGN PATENT DOCUMENTS

| | | | |
|---|---|---|---|
| 245487 | 10/1969 | U.S.S.R. | 119/3 |
| 599777 | 3/1978 | U.S.S.R. | 119/3 |
| 959717 | 9/1982 | U.S.S.R. | 119/3 |
| 970408 | 10/1982 | U.S.S.R. | 119/3 |
| 995716 | 2/1983 | U.S.S.R. | 119/3 |
| 1056970 | 11/1983 | U.S.S.R. | 119/3 |

Primary Examiner—Tom Noland
Attorney, Agent, or Firm—Ladas & Parry

[57] ABSTRACT

A counting device for fish, especially smolt, comprising a pipe that is open at both ends and is adapted for being secured at one end to a vessel containing a quantity of fish to be counted. To the pipe devices are connected for generating a water flow in the pipe, the water flow having a higher velocity at the outer portion of the pipe in a direction towards the outlet of the pipe that at the portion closed to the vessel. At the outlet of the pipe a device known per se for detecting each individual fish is provided.

10 Claims, 2 Drawing Sheets

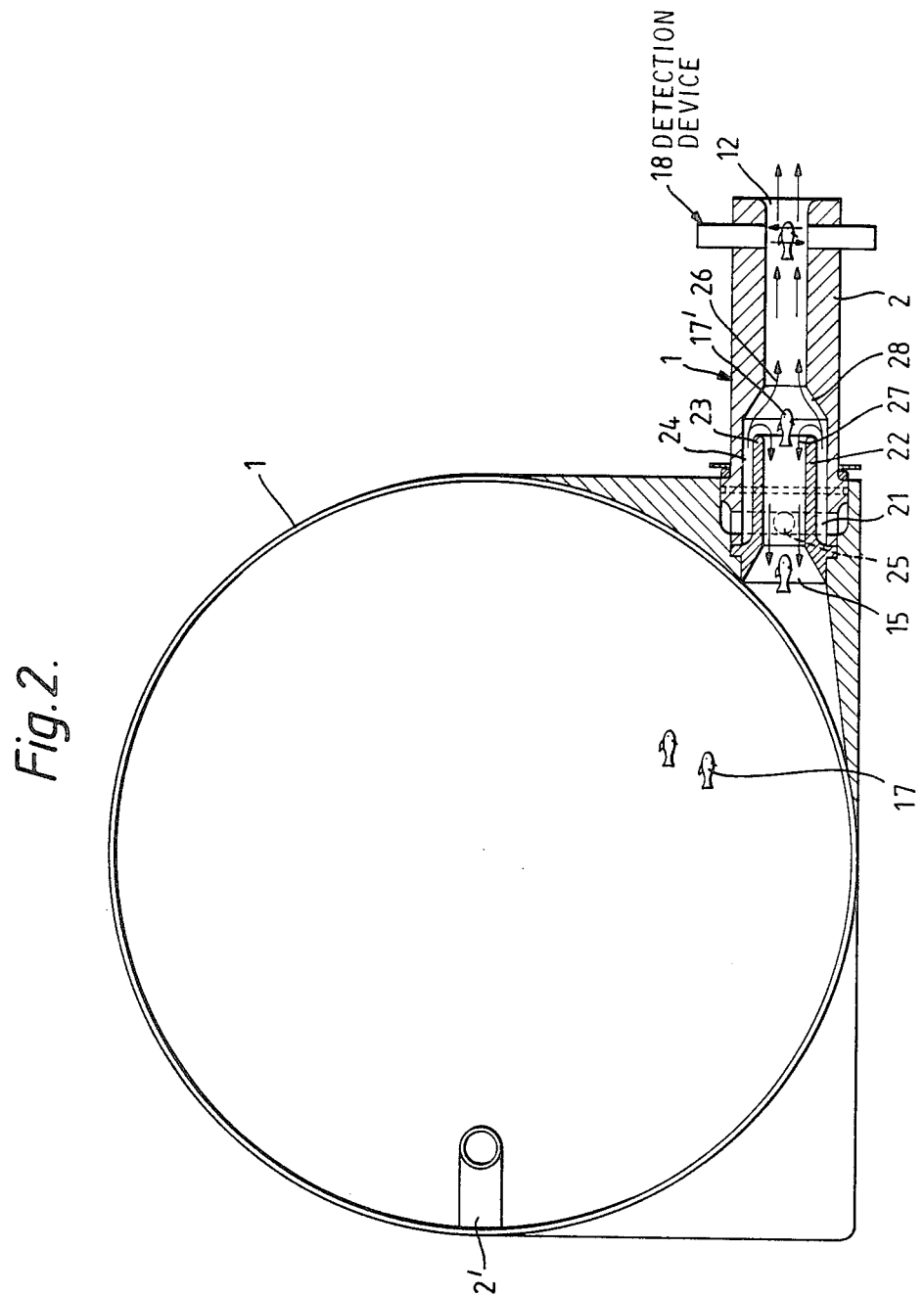

COUNTING DEVICE FOR FISH, ESPECIALLY SMOLT

BACKGROUND OF THE INVENTION

The present invention relates to a counting device for fish, especially smolt.

Fish farming is steadily increasing, and in this, production of smolt is an important facet. Smolt is young fish grown to a size permitting delivery from a hatchery to fish farmers. When smolt is sold, there is, naturally, a need for counting the number. Today, this is done manually, and it is time comsuming and strenuous work. It would also be desirable to count the number of smolt in a breeding container during production in order to be able to determine the quantity of feed, medicaments, and the like, supplied. At present, there are no simple and easily handled devices for this.

SUMMARY OF THE INVENTION

It is, thus, an object of the present invention to provide a device for counting fish, especially smolt, said device being inexpensive to acquire and simple in use.

According to the invention, this is achieved by a tube pipe or sleeve with one end for securing to a vessel containing the quantity of fish to be counted and an opposite, outlet end with a known device for detecting each fish, including smolt, passing through the pipe thereat, whereby the fish can be counted. A device is connected to the pipe between its ends for flowing water towards both ends of the pipe, the flow towards the outlet end of said pipe having the higher velocity.

A preferred embodiment of the counting device according to the invention is characterized in that the device for generating the flows inside said pipe has at least one inlet into said pipe between its ends for supply of water flow towards the outlet end of the pipe and at least one inlet into said pipe between its ends for supply of water flow towards the one, fish-inlet end of the pipe at said vessel. A further development of the invention is characterized in that said inlet or inlets for feeding water into said pipe to generate a water flow directed towards the outlet of said pipe opens in an acute angle in relation to the longitudinal direction of said pipe and is directed towards said outlet, that said inlet or inlets for feeding water into said pipe for generating a water flow directed towards the fish-inlet at said vessel opens in an acute angle in relation to the longitudinal direction of said pipe and is directed towards said fish-inlet, and that the inlets for feeding water into said pipe are close to each other.

Another feature of the invention is characterized in that said inlet or inlets for feeding water into said pipe to generate a water flow towards the outlet of said pipe is closest to the fish-inlet at said vessel and that the inlet or inlets for feeding water into said pipe to generate a water flow towards said fish inlet at said vessel is closest to the pipe outlet.

Another embodiment of the device for generating the flows inside said pipe is characterized in that the inside of said pipe has an enlargement at the fish-inlet of the pipe at said vessel. A nozzle is sealingly secured in the enlarged pipe section at the vessel and opens into said enlarged section. The nozzle is at a distance from the wall of said enlarged section to form an annular space, and one or more inlets for supply of water causing a flow through said pipe that is stronger toward the outlet than one toward the fish-inlet of the pipe near said vessel are provided in said annular space.

BRIEF DESCRIPTION OF THE DRAWING

The invention is now to be disclosed in more detail with reference to the drawing wherein FIG. 2 shows a second embodiment in a horizontal section.

DESCRIPTION OF THE PREFERRED EMBODIMENTS

Figure 1:
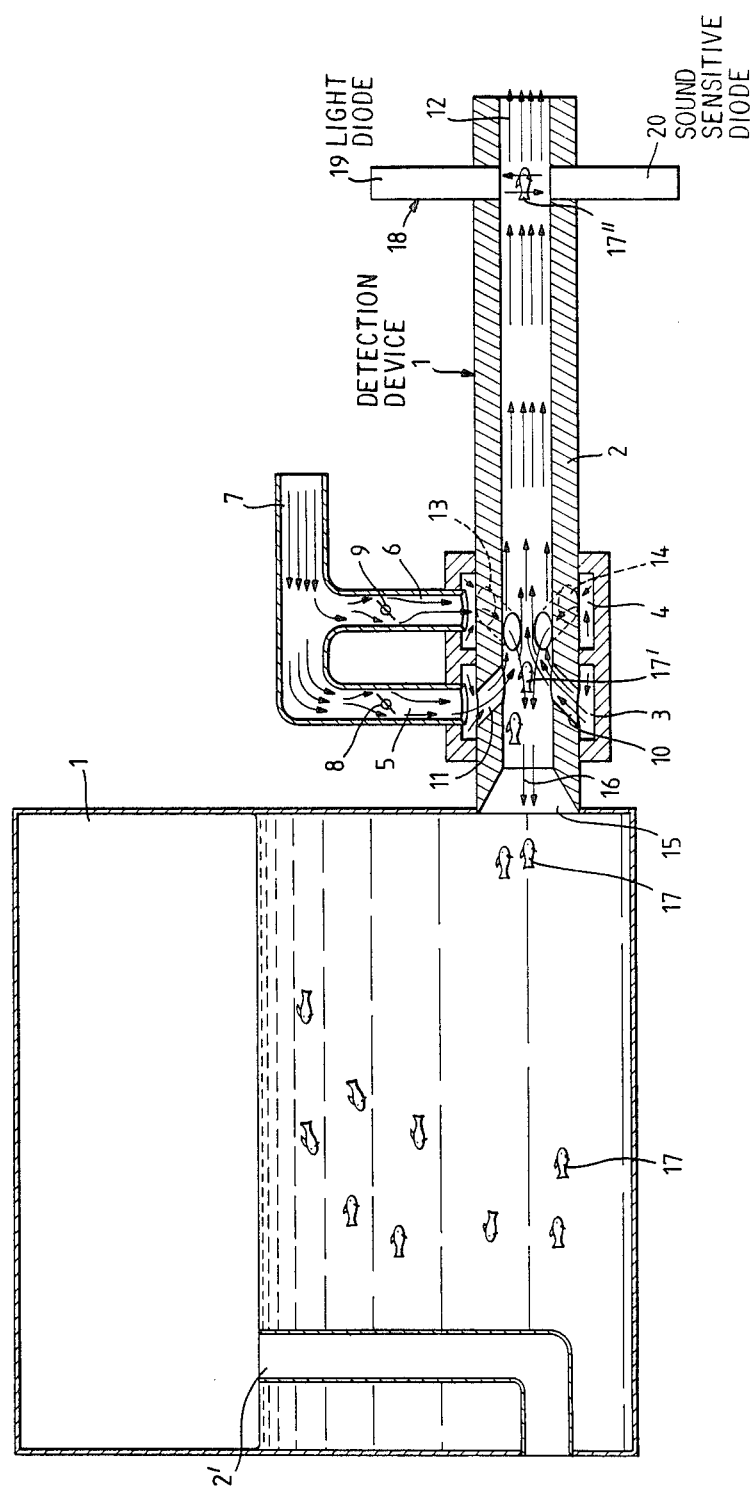
FIG. 1 shows a first embodiment of the device according to the invention in a vertical section.

When fish, e.g. smolt, are to be counted, it will, as a rule, be desirable to transfer the fish from their production basin to a smaller vessel 1', provided with an overflow 2'. An embodiment of the device 1 according to the invention is connected to the lower end at one side of said vessel. The connection per se is only diagrammatically indicated. The device comprises a short length of pipe 2. In practice, a longer pipe may also be used. Said pipe has an open flow connection with the interior of said vessel. At that end of said pipe positioned closest to the vessel, two annular chambers 3 and 4 are provided outside said pipe. With each annular chamber a pipe 5 and 6, resp., is connected for supply of pressurized water from a common conduit 7. By the aid of valves 8 and 9, the water flow in each pipe or conduit 5 and 6 can be adjusted. From the annular chamber closest to vessel 1, two channels 10,11 are provided through the wall of pipe 2. Said channels 10, 11 extend obliquely outwards toward an outlet 12 of pipe 2. In the shown embodiment, channels 10,11 are inclined at an angle of 45° to the axis of said pipe. From ring chamber 4, there are equally provided two channels 13 and 14 inwards through the wall of said pipe 2. Said channels extend obliquely towards a fish-inlet end 15 of pipe 2 at the vessel. These channels are also inclined 45° to the axis of pipe 2. Channels 13, 14 are displaced in a circumferential direction in relation to channels 10, 11. When water is supplied through conduits 5, 6, 7 through channels 10, 11, 13, 14, water from channels 13, 14 will cause a flow in pipe 2 in the direction of arrow 16, towards vessel 1. Fish will always go against the current, and the smolt 17 present in vessel 1 will make for inlet 15 to pipe 2 and swim against the current inside said pipe. This tendency is enhanced if said vessel has a pale color inside and said inlet 15 to pipe 2 has a dark color. When a smolt 17 reaches the position marked 17', it will suddenly be exposed to a strong current from channels 10,11 in the direction towards the outlet 12 of pipe 2. The smolt 17' will, thus, accelerate strongly and there will be a distance between this smolt and a succeeding smolt, even though it enters the pipe 2 closely after the first smolt. When the smolt has arrived at the position marked 17'', it will pass a device of detection 18, which may be a light diode 19 and a sound sensitive diode 20.

Practical tests with this device showed that counting is very rapid. 1000 fish can be counted in a few minutes. Their influx into inlet 15 can be hastened by cautiously frightening the fish towards inlet 15 with one's hand.

In FIG. 2, showing a second embodiment of the device according to the invention, the same reference numbers are used for corresponding parts. In the same manner as in the embodiment according to FIG. 1, there is a device 1 according to the invention connected to the lower portion of vessel 1', which is provided with an overflow 2'. The vessel 1' has a circular cross section and the device 1 according to the invention is connected tangentially to said vessel. In this case the connection is shown in more detail. The passage in pipe 2 has an enlarged portion 21 at the end of the pipe facing vessel 1. In this enlargement, a nozzle 22 is inserted. One end of nozzle 22 forms the inlet 15 from the vessel and the other end 23 opens into said enlarged section 21. The nozzle has a smaller outer diameter than the inner diameter of enlargement 21, so that there is an annular space 24 formed about the nozzle. To said annular space is a conduit 25, shown in a dotted line, supplying pressurized water to the annular space 21. Part of the water flowing in through conduit 25 will flow in the direction of arrow 26 towards outlet 12 of the pipe. Part of the water is, however, forced back in the direction of arrow 27 towards the vessel 1' due to a narrowed portion 28 of the passage through pipe 2. The conditions for obtaining a flow in the direction of arrow 27 through the nozzle towards vessel 1' is that the pressure in supply conduit 25 is relatively high. If the pressure is reduced below a certain level, the flow will be directed towards outlet 12 only. Even under such conditions, the device according to the invention will function to a certain degree, especially if the fish are directed towards inlet 15 and if said inlet 15 is maintained in a dark color that will attract the fish, especially if it is a little frightened. The fish will then be conveyed through nozzle 22 due to the inward flow. In position 17' the fish will be accelerated due to the much stronger current arising in that narrowed portion of the passage in said pipe. At the outlet end of the pipe, a detecting device 18 is provided as in the embodiment shown in FIG. 1.

The invention is not limited to the embodiments disclosed above and shown in the drawing. Those skilled in the art will understand that there are many practical approaches for generating currents of different directions through pipe 2 or currents in the same direction, but with different velocities within the scope of the following claims. It is essential that there is a current through the pipe towards outlet 12 of the pipe and that the current is more rapid in the section of pipe 2 close to outlet 12 than at the inlet end of pipe 2. Another important feature is that there is a relatively abrupt transition between the strong and the slower current. The slower current can vary from plus to minus, i.e. the current or flow may be directed toward vessel 1 or toward the outlet 12 of the pipe, or it may be almost non-existent.

Having described my invention, I claim:

1. In a device for counting fish, the improvement comprising:
   a pipe having one, fish-inlet end for connection to a vessel with fish to be counted and an opposite, outlet end;
   flow means connected to the pipe between its ends for flowing water towards both ends of the pipe, the flow towards the outlet end of the pipe having the higher velocity; and
   a device for detecting each fish passing through the pipe at the outlet end of the pipe, whereby the fish may be counted.

2. The counting device of claim 1, wherein the flow means comprises a first inlet for feeding pressurized water into the pipe and generating the water flow towards the outlet end of the pipe and a second inlet for feeding pressurized water into the pipe and generating the water flow towards the one, fish-inlet end of the pipe.

3. The counting device of claim 2, wherein the first and second inlets open into the pipe at acute angles, are directed, respectively, toward the ends of the pipe toward which they generate flow, and are close to each other in comparison to the length of the pipe.

4. The counting device of claim 3, wherein the first inlet is closer to the one, fish-inlet end of the pipe than the second inlet.

5. The counting device of claim 1, wherein the first and second inlets are displaced circumferentially about the pipe relative to each other.

6. The counting device of claim 3, wherein the first and second inlets are displaced circumferentially about the pipe relative to each other.

7. The counting device of claim 2, wherein the first inlet is closer to the one, fish-inlet end of the pipe than the second inlet.

8. The counting device of claim 7, wherein the first and second inlets are displaced circumferentially about the pipe relative to each other.

9. The counting device of claim 2, wherein the first and second inlets are displaced circumferentially about the pipe relative to each other.

10. The counting device of claim 1, wherein the flow means comprises an enlarged portion of the inside of the pipe at the one, fish-inlet end of the pipe; a nozzle sealingly secured into the enlarged portion opening thereinto, and at a distance from the inside of the pipe thereat for forming an annular space thereabout; and an inlet for feeding pressurized water into the annular space.

* * * * *